R. E. HELLMUND.
ARMATURE WINDING.
APPLICATION FILED JUNE 4, 1915.

1,298,705. Patented Apr. 1, 1919.

WITNESSES:

INVENTOR
Rudolf E. Hellmund.
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

ARMATURE-WINDING.

1,298,705.　　　Specification of Letters Patent.　　Patented Apr. 1, 1919.

Application filed June 4, 1915. Serial No. 32,158.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Armature-Windings, of which the following is a specification.

My invention relates to armature windings for dynamo-electric machines, especially of the single-phase commutator type, and it has for its object to provide means whereby the inductive disturbances in coils undergoing commutation shall be minimized, with consequent improvement of the commutation.

Figure 1:
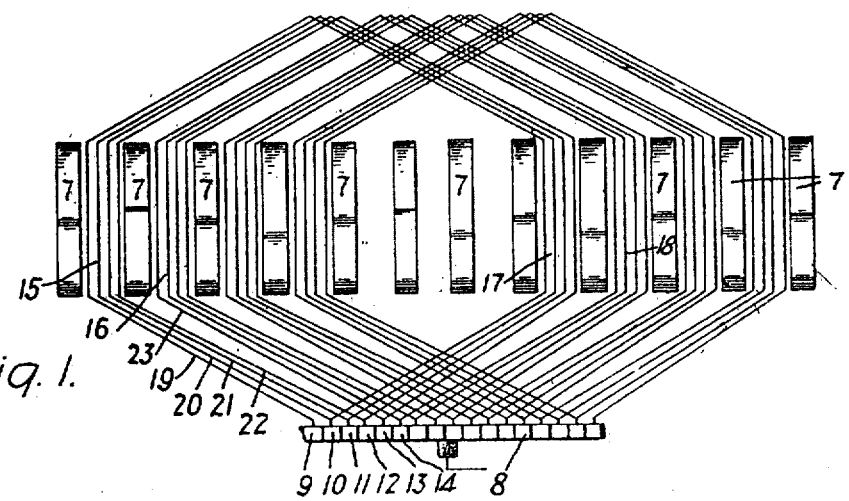
Figures 3, 4:
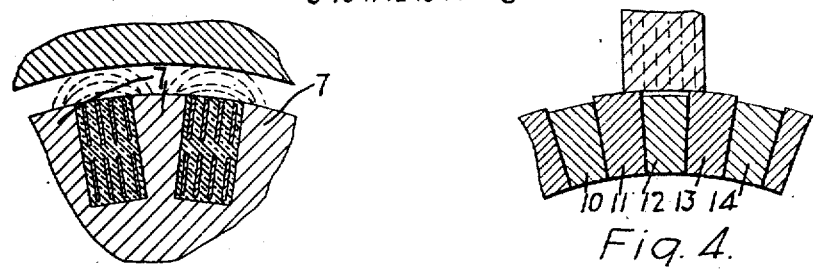
Figure 2:
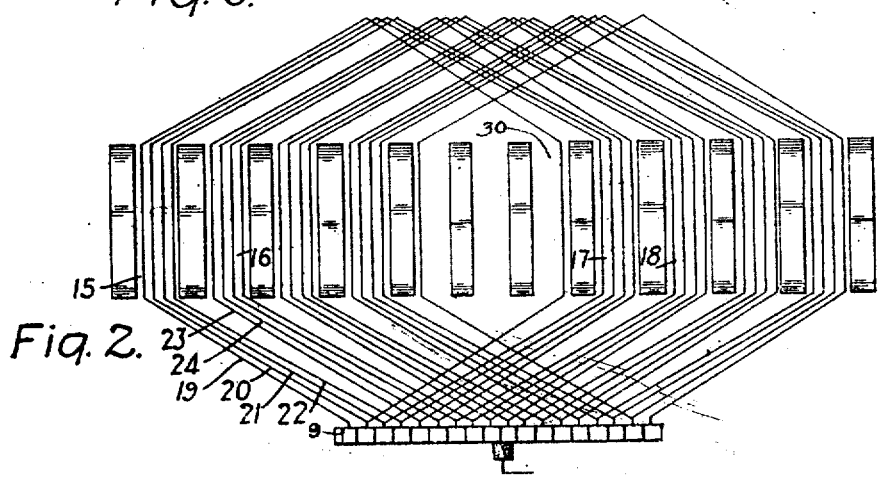

In the accompanying drawing, Figure 1 is a developed view of an armature winding as hitherto generally constructed, serving to illustrate the theory of my explanation, Fig. 2 is a similar developed view of an armature winding embodying my invention; Fig. 3 is a sectional view showing the flux distribution about the armature conductors and Fig. 4 is a sectional view of a commutator illustrating the effects of sparking caused by improper armature winding.

In single-phase commutator motors, the problem of commutation is rendered extremely difficult, especially at starting, because of the fact that the field flux alternates and induces a transformer voltage in the coils which are, for the time being, short circuited by the brushes. The said transformer voltage causes short-circuit currents to flow in said coils and, when contact is broken at the brush and the short-circuit current is broken, a harmful spark is produced at the corresponding commutator segment. This spark will increase in intensity with the self-induction of the short-circuited coil. The magnetic flux causing self-induction in the short-circuited coils extends from one side of the armature slot to the other and also from the top of a tooth to the stator iron and back to the top of the next tooth, as indicated in Fig. 3. These magnetic fluxes must necessarily die out whenever the short circuit through a coil is broken, and the disappearance of the fluxes induces a voltage in the coil which adds to the short-circuit voltage and increases the intensity of the commutator spark. If it so happens, however, that, when the short-circuit current in a coil in one slot is dying out, an equal amount of short-circuit current is being built up in another coil lying in the same slot, the resultant flux in the first mentioned coil is not changed and, therefore, no voltage of self-induction will be set up in the circuit which is about to be interrupted. In other words, the commutator spark will be less harmful in those cases where the short-circuit current is being transferred from a coil to another coil in the same slots than it is in the same case where it is transferred from a certain coil lying in one pair of slots to a coil located in a distinctly separate pair of slots.

By my invention, I so wind an armature that commutation progresses either from one coil to another coil lying in the same slots or from one coil to another coil, half of which lies in the same slot and half of which is in a new slot. The next succeeding coil to be commutated lies partially in said new slot and, as to the remainder, within still another slot. By this means I provide a gradual transfer from one set of slots to another set, thus greatly decreasing the rate of change of the magnetic flux through the short-circuited coils and, in like degree, reducing the short-circuit voltage due to self-induction.

Referring now to Fig. 1 for a fuller understanding of the principles underlying my invention, I have shown at 7—7 the teeth of a slotted armature of any desired form provided with a commutator 8 having segments 9, 10, 11, 12, 13, 14, etc. Starting from the commutator segment 9, a conductor 19 passes adjacent to the left-hand wall of a slot 15 and thence adjacent to the left-hand wall in a slot 17, returning to the commutator segment 10. Conductors 20 and 21 of the same armature coil also lie in the slots 15 and 17 but are not adjacent to the walls thereof. The remaining conductor 22 of the coil in question, however, lies next to the right-hand wall in both slots 15 and 17. Passing to the next armature coil, the conductor 23 is in all respects similar to the conductor 19.

Assuming that the armature coils move from the right to the left, the transfer of the short-circuit current from the turn 19 to the turn 20, from the turn 20 to the turn 21 and from the turn 21 to the turn 22 will be easy because these turns lie in the same slots and there is therefore no abrupt change in the magnetic flux interlinked therewith. When, however, the brush passes from the commutator segment 12, there is an abrupt transfer of short-circuit current from the turn 22 lying in the slots 15 and 17 to the turn 23 lying in the slots 16 and 18. As will be apparent from an inspection of Fig. 3, there results an abrupt shifting of the short-circuit flux from the slots 15 and 17 to the slots 16 and 18, with consequent production of a high self-induced electromotive force in the turn 22 and burning at the commutator segment 12.

When the direction of rotation is reversed, there will be produced, in like manner, a high electromotive force in the turns 19 and 23 with consequent burning of the commutator segments 10 and 14. The commutator will therefore assume a condition, as indicated in Fig. 4, wherein certain commutator segments which are connected to coils lying next to the slot walls are burned away at the top to a slight degree. As a result of this burning or pitting, normal contact with the brush is interfered with and, therefore, excessive burning takes place from normal load current, lowering the upper surface of the segments in question to such a point that successful operation is impossible.

Turning now to Fig. 2, illustrating my invention, like parts are numbered similarly to Fig. 1 for ease of reference. The turn 19, starting from the commutator segment 9, is placed adjacent to the left-hand wall in the slot 15 and thence adjacent to the right-hand wall in the slot 30 rather than passing through the slot 17 in common with the other members of the same coil. The turns 20, 21 and 22 are provided with the same pitch as in Fig. 1 so that they lie in the slot 17 but it will be observed that the turn 20 lies adjacent to the left-hand wall in the slot 17 because of the absence of the turn 19. The turn 23 is given a short pitch similar to that of the turn 19, so that it occupies the right-hand position in the slot 17.

Assuming the armature to turn from right to left, as in Fig. 1, the transfer from the turn 22 to the turn 23 will not be as abrupt, as in Fig. 1, because of the fact that, while the left-hand sides of these turns lie in the neighboring slots 15 and 16, the right-hand portions lie in the same slot 17. The complete transfer from the slots 15 and 17 to the slots 16 and 18 is not completed until the transfer is made from the turn 23 to the turn 24, a change of similar abruptness to that just indicated in connection with turns 22 and 23 because of the fact that right-hand halves of the turns 23 and 24 lie in adjacent slots, whereas their left-hand halves lie in the same slot. It will thus be observed that, by doubling the time for shifting the short-circuit current from one pair of slots to another pair of slots, one slot at a time, I am enabled to greatly reduce the sparking at the commutator and, by operating the motor alternately in each direction, as is common in railway practice, the wear on the commutator will be equalized on all segments thereof.

It will be observed that the turns 19, 23, etc., have a shorter pitch than the remaining turns and are also of somewhat different shape. I therefore find it convenient to make these turns from two half turns of the appropriate shape, joined at the outer end.

By the use of a compensating winding, practically all spark-producing electromotive forces may be eliminated during normal operation of a motor and, therefore, by the use of my invention for reducing sparking at starting and by the use of a compensating winding to perform the same function during operation, I am enabled to produce a motor which is practically free from sparking under all conditions.

While I have shown my invention in its preferred embodiment, it will be obvious to those skilled in the art that the same result may be achieved by using other types of winding, such, for example, as one in which the pitch of the split turn is greater than that of the remaining turns in each armature coil and I may, if desired, split more than one turn in each coil. All such modifications, however, would differ in operation from that shown only in degree and not in principle and I desire, therefore, that no restrictions shall be placed upon my invention except such as are imposed by the prior art or are specifically set forth in the appended claims.

I claim as my invention:

1. An armature winding having two coils per slot, each coil comprising an even multiple of two turns, three-fourths of said turns traversing a second slot and the remaining turns traversing a third slot.

2. In a dynamo-electric machine of the commutator type, the combination with an armature core member provided with $m$ winding slots, of an armature winding mounted in said slots and comprising $4m$ turns, whereby portions of 8 turns lie in each slot, the turns having portions lying in any one slot forming a winding group whereof 6 turns have a pitch of P slots and 2 turns have a pitch of P—1 slots, a connection from corresponding portions of each winding turn to an appropriate segment of the commutator cylinder of said machine, and a brush bearing upon said commutator cylinder of sufficient width to successively short-circuit each of said winding turns.

3. In a dynamo-electric machine of the commutator type, the combination with an armature core member provided with $m$ winding slots of an armature winding mounted in said slots and comprising $4m$ turns, whereby portions of 8 turns lie in each slot, the turns having portions lying in any one slot forming a winding group whereof 6 turns have a pitch of P slots and 2 turns have a pitch of P—1 slots, a connection from points in said winding spaced apart by $q$ turns, where $q$ is any positive integer, to appropriate segments in the commutator cylinder of said machine, and a brush bearing upon said commutator cylinder of sufficient width to successively short-circuit each of the winding portions determined by said points of connection.

4. In a dynamo-electric machine of the commutator type, the combination with an armature core member provided with $m$ winding slots, of an armature winding mounted in said slots and comprising $4mn$ turns, where $n$ is any positive integer, whereby portions of $8mn$ turns lie in each slot, the turns having portions lying in any one slot forming a winding group whereof $6mn$ turns have a pitch of P slots and $2mn$ turns have a pitch of P+1 slots, a connection from corresponding portions of each winding to an appropriate segment of the commutator cylinder of said machine, and a brush bearing upon said commutator cylinder of sufficient width to successively short-circuit each of said winding turns.

In testimony whereof, I have hereunto subscribed my name this 27th day of May, 1915.

RUDOLF E. HELLMUND.